US012670729B2

(12) United States Patent
Ghannam et al.

(10) Patent No.: US 12,670,729 B2
(45) Date of Patent: Jun. 30, 2026

(54) SELECTIVE PRIVACY MODE OPERATION FOR IN-CABIN MONITORING

(71) Applicant: Ford Global Technologies, LLC, Dearborn, MI (US)

(72) Inventors: Mahmoud Yousef Ghannam, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 525 days.

(21) Appl. No.: 18/122,257

(22) Filed: Mar. 16, 2023

(65) Prior Publication Data

US 2024/0312228 A1 Sep. 19, 2024

(51) Int. Cl.
| | |
|---|---|
| *G06V 20/59* | (2022.01) |
| *G06V 10/764* | (2022.01) |
| *G06V 10/96* | (2022.01) |
| *G06V 20/52* | (2022.01) |
| *G06V 40/10* | (2022.01) |
| *H04N 7/18* | (2006.01) |

(52) U.S. Cl.
CPC ............ *G06V 20/59* (2022.01); *G06V 10/764* (2022.01); *G06V 10/96* (2022.01); *G06V 20/52* (2022.01); *G06V 40/10* (2022.01); *H04N 7/183* (2013.01)

(58) Field of Classification Search
CPC ........ G06V 20/59; G06V 20/52; G06V 10/96; G06V 40/10; H04N 7/183
See application file for complete search history.

(56) References Cited

U.S. PATENT DOCUMENTS

| | | | |
|---|---|---|---|
| 9,235,941 B2 | 1/2016 | Ricci et al. | |
| 9,787,812 B2 * | 10/2017 | Feit ..................... | H04M 1/6075 |
| 10,491,733 B2 * | 11/2019 | Feit .................. | H04M 1/72454 |
| 11,270,525 B2 | 3/2022 | Moniot et al. | |
| 11,417,122 B2 * | 8/2022 | Park ....................... | G06V 20/59 |
| 12,054,164 B2 * | 8/2024 | Tsai ....................... | B60W 60/00 |
| 12,377,215 B1 * | 8/2025 | Bibian ................ | A61M 5/1723 |
| 2013/0148845 A1 * | 6/2013 | Maeda ..................... | G08G 1/04 |
| | | | 382/103 |
| 2014/0257873 A1 * | 9/2014 | Hayward ............... | G06Q 40/08 |
| | | | 705/4 |
| 2016/0059864 A1 * | 3/2016 | Feit ..................... | H04M 1/6075 |
| | | | 701/36 |

(Continued)

*Primary Examiner* — Shaghayegh Azima
(74) *Attorney, Agent, or Firm* — Frank Lollo; Price Heneveld LLP

(57) ABSTRACT

A system for monitoring one or more events in a vehicle includes a time-of-flight sensor configured to generate a point cloud representing an interior of the vehicle. The point cloud includes three-dimensional positional information of the interior. A camera is configured to capture image data representing the interior of the vehicle. The processing circuitry is configured to process the image data from the camera in a first operational mode, process the point cloud from the time-of-flight sensor in a second operational mode, detect, based on either of the image data or the point cloud, an occupant of the vehicle, detect an indication from the occupant to disable the first operational mode, and selectively operate between the first and second operational modes based on at least one of the image data and the indication.

17 Claims, 8 Drawing Sheets

(56) References Cited

U.S. PATENT DOCUMENTS

| | | | | |
|---|---|---|---|---|
| 2016/0375895 A1* | 12/2016 | Park | B60W 10/06 | |
| | | | 701/22 | |
| 2017/0295274 A1* | 10/2017 | Feit | B60K 35/22 | |
| 2018/0050664 A1* | 2/2018 | Tarte | B60R 25/31 | |
| 2018/0189518 A1* | 7/2018 | Batten | G06Q 50/26 | |
| 2018/0329414 A1* | 11/2018 | Igarashi | B60W 50/082 | |
| 2021/0123068 A1 | 4/2021 | Bundock et al. | | |
| 2021/0149397 A1* | 5/2021 | Shin | G06V 20/56 | |
| 2022/0253550 A1* | 8/2022 | Sohmshetty | G05D 1/0212 | |
| 2022/0256123 A1* | 8/2022 | Parenti | G06N 3/09 | |
| 2022/0266753 A1* | 8/2022 | Nakamura | G06T 7/70 | |
| 2023/0249621 A1* | 8/2023 | Maeda | B60R 11/02 | |
| | | | 348/148 | |
| 2023/0391344 A1* | 12/2023 | Khamis | G10L 25/63 | |
| 2023/0400854 A1* | 12/2023 | Brandon | B60R 16/03 | |
| 2025/0004483 A1* | 1/2025 | Oda | G08G 5/55 | |

* cited by examiner

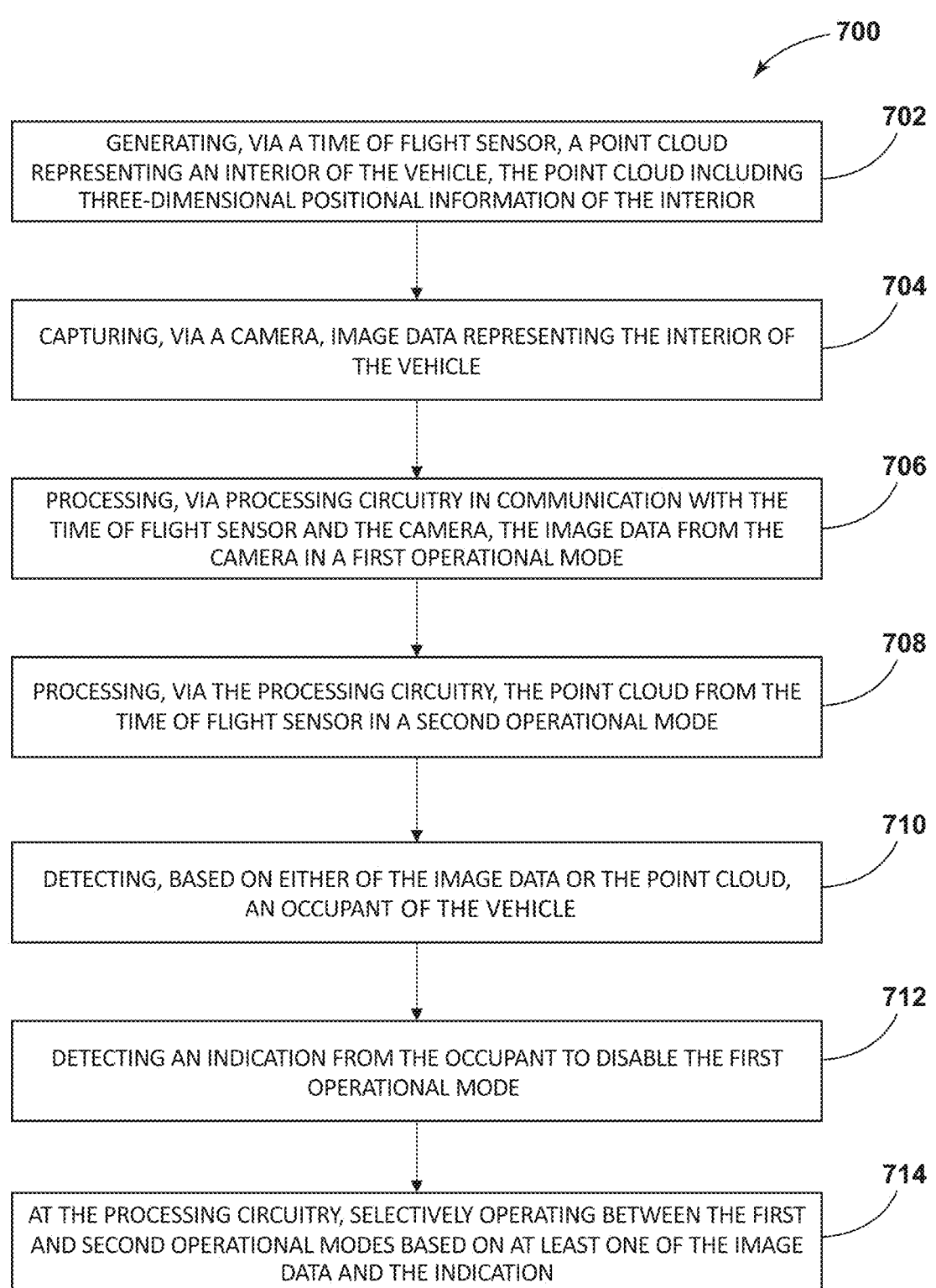

700

702
GENERATING, VIA A TIME OF FLIGHT SENSOR, A POINT CLOUD REPRESENTING AN INTERIOR OF THE VEHICLE, THE POINT CLOUD INCLUDING THREE-DIMENSIONAL POSITIONAL INFORMATION OF THE INTERIOR

704
CAPTURING, VIA A CAMERA, IMAGE DATA REPRESENTING THE INTERIOR OF THE VEHICLE

706
PROCESSING, VIA PROCESSING CIRCUITRY IN COMMUNICATION WITH THE TIME OF FLIGHT SENSOR AND THE CAMERA, THE IMAGE DATA FROM THE CAMERA IN A FIRST OPERATIONAL MODE

708
PROCESSING, VIA THE PROCESSING CIRCUITRY, THE POINT CLOUD FROM THE TIME OF FLIGHT SENSOR IN A SECOND OPERATIONAL MODE

710
DETECTING, BASED ON EITHER OF THE IMAGE DATA OR THE POINT CLOUD, AN OCCUPANT OF THE VEHICLE

712
DETECTING AN INDICATION FROM THE OCCUPANT TO DISABLE THE FIRST OPERATIONAL MODE

714
AT THE PROCESSING CIRCUITRY, SELECTIVELY OPERATING BETWEEN THE FIRST AND SECOND OPERATIONAL MODES BASED ON AT LEAST ONE OF THE IMAGE DATA AND THE INDICATION

FIG. 7

SELECTIVE PRIVACY MODE OPERATION FOR IN-CABIN MONITORING

FIELD OF THE DISCLOSURE

The present disclosure generally relates to monitoring events in a vehicle and, more particularly, relates to selective privacy mode operation for in-cabin monitoring.

BACKGROUND OF THE DISCLOSURE

Conventional occupant classification systems for vehicles may include sensors that capture information about occupants of the vehicle. Typically, these systems operate in a single operation that may detect the identity or other private information about the occupants. There is a need for a dynamic detection system capable of limiting privacy concerns.

SUMMARY OF THE DISCLOSURE

According to a first aspect of the present disclosure, a system for monitoring one or more events in a vehicle includes a time-of-flight sensor configured to generate a point cloud representing an interior of the vehicle. The point cloud includes three-dimensional positional information of the interior. A camera is configured to capture image data representing the interior of the vehicle. The processing circuitry is in communication with the time-of-flight sensor and the camera is configured to process the image data from the camera in a first operational mode. The processing circuitry is further configured to process the point cloud from the time-of-flight sensor in a second operational mode. The processing circuitry is configured to detect, based on either of the image data or the point cloud, an occupant of the vehicle. The processing circuitry is configured to detect an indication from the occupant to disable the first operational mode. The processing circuitry is configured to selectively operate between the first and second operational modes based on at least one of the image data and the indication.

Embodiments of the first aspect of the present disclosure can include any one or a combination of the following features:

the processing circuitry is further configured to determine a privacy condition for the interior based on the image data;

the processing circuitry is further configured to determine an identity of the occupant based on the image data;

the processing circuitry is further configured to classify the occupant as a child based on at least one of the image data and the point cloud;

the processing circuitry is further configured to disable the first operational mode in response to detection of the privacy condition, and enable the second operational mode in response to detection of the privacy condition;

the processing circuitry is further configured to periodically enable the first operational mode at intervals while in the second operational mode, and process the image data captured during the intervals to determine a change in the privacy condition;

a user interface in communication with the processing circuitry, wherein the processing circuitry is further configured to communicate an instruction to present an option to enable the first operational mode at the user interface based on determining the change in the privacy condition, receive a selection by the occupant to select between the first and second operational modes, and update the second operational mode based on the selection;

the processing circuitry is further configured to determine a lighting condition of the interior based on the image data, and operate in the second operational mode based on the lighting condition;

a light sensor in communication with the processing circuitry and configured to detect the lighting condition;

the processing circuitry is further configured to determine an ineffective condition of a monitoring algorithms for the interior based on the image data, and enable the second operational mode based on the ineffective condition;

an input device in communication with the processing circuitry, wherein the input device is configured to receive the indication;

a cover detector in communication with the processing circuitry and configured to detect an obstruction for the camera and in communication with the processing circuitry, wherein the input device is the cover detector;

the processing circuitry is further configured to compare a first power consumption level of the first operational mode to a second power consumption level of the second operational mode, wherein selective operation between the first and second operational modes is based further on the comparison of the power consumption levels; and a user interface in communication with the processing circuitry, wherein the processing circuitry is further configured to communicate an instruction to present an option to enable the first operational mode at the user interface based on the comparison of the power consumption levels, receive a selection by the occupant to select between the first and second operational modes, and update the second operational mode based on the selection.

According to a second aspect of the present disclosure, a method for monitoring one or more events in a vehicle includes generating, via a time-of-flight sensor, a point cloud representing an interior of the vehicle. The point cloud includes three-dimensional positional information of the interior. The method further includes capturing via a camera, image data representing the interior of the vehicle. The method further includes processing via a processing circuitry in communication with the time-of-flight sensor and the camera, the image data from the camera in a first operational mode. The method further includes processing, via the processing circuitry, the point cloud from the time-of-flight sensor in a second operational mode. The method further includes detecting, based on either of the image data or the point cloud, an occupant of the vehicle. The method further includes detecting an indication from the occupant to disable the first operational mode. The method further includes, at the processing circuitry, selectively operating between the first and second operational modes based on at least one of the image data and the indication.

Embodiments of the second aspect of the present disclosure can include any one or a combination of the following features:

determining, via the processing circuitry, a privacy condition for the interior based on the image data;

determining an identity of the occupant based on the image data;

classifying the occupant as a child based on at least one of the image data and the point cloud; and disabling the first operational mode in response to detection of the privacy condition, and enabling the second operational mode in response to detection of the privacy condition.

According to a third aspect of the present disclosure, a system for monitoring one or more events in a vehicle includes a time-of-flight sensor configured to capture a point cloud representing an interior of the vehicle. A camera is configured to capture image data representing the interior of the vehicle. Processing circuitry is in communication with the time-of-flight sensor, the camera, and the input device. The processing circuitry is configured to process the image data from the camera in a first operational mode. The processing circuitry is further configured to process the point cloud from the time-of-flight sensor in a second operational mode. The processing circuitry is further configured to detect, based on either of the image data or the point cloud, an occupant of the vehicle. The processing circuitry is further configured to classify the occupant as a child based on at least one of the image data and the point cloud. The processing circuitry is further configured to determine a privacy condition for the interior based on the classification of the occupant. The processing circuitry is further configured to disable the first operational mode in response to detection of the privacy condition. The processing circuitry is further configured to enable the second operational mode in response to detection of the privacy condition.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 7 is an exemplary monitoring method for a vehicle according to one aspect of the present disclosure.

DETAILED DESCRIPTION OF PREFERRED EMBODIMENTS

Figure 1A:
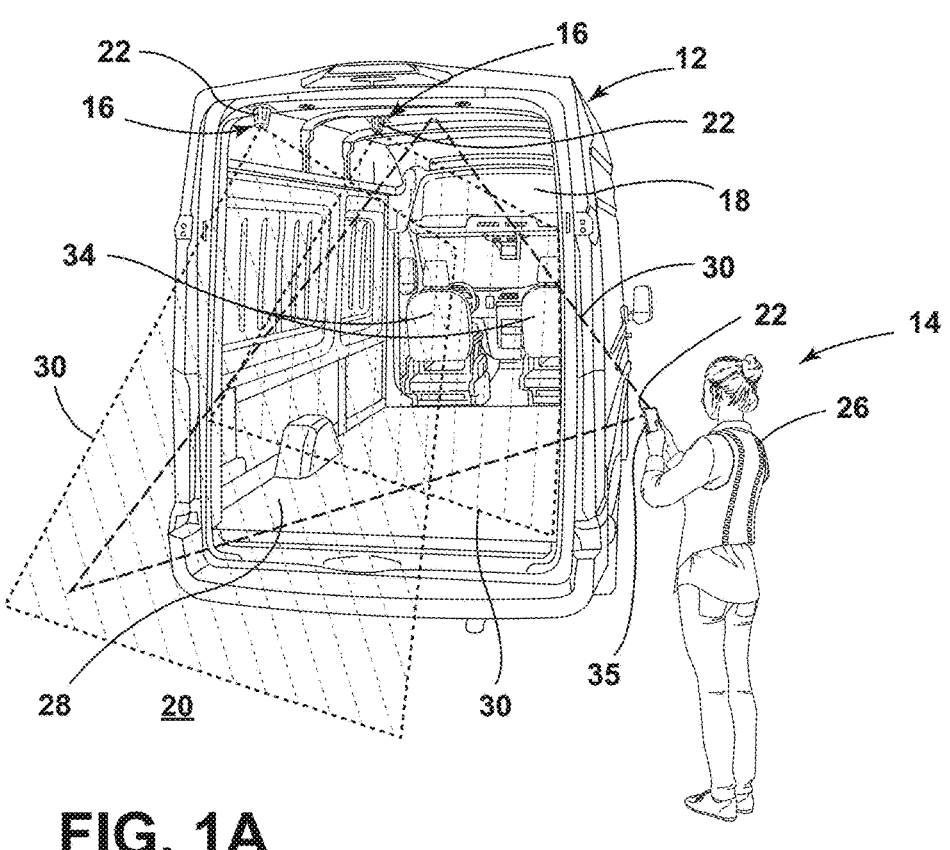
FIG. 1A is a perspective view of a cargo van incorporating a detection system of the present disclosure in a rear space of the cargo van.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1A. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to vehicle space morphing. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1A-5, the present disclosure generally relates to a detection system 10 for a vehicle 12 that utilizes three-dimensional image sensing to detect information about an environment 14 in or around the vehicle 12. The three-dimensional image sensing may be accomplished via one or more time-of-flight (ToF) sensors 16 that are configured to map a three-dimensional space such as an interior 18 of the vehicle 12 and/or a region exterior 20 to the vehicle 12. For example, the one or more time-of-flight sensors 16 may include at least one light detection and ranging (LiDAR) module 22 configured to output pulses of light, measure a time of flight for the pulses of light to return from the environment 14 to the at least one LiDAR module 22, and generate at least one point cloud 24 of the environment 14 based on the time-of-flight of the pulses of light. In this way, the LiDAR module 22 may provide information regarding three-dimensional shapes of the environment 14 being scanned, including geometries, proportions, or other measurement information related to the environment 14 and/or occupants 26 for the vehicle 12.

The LiDAR modules 22 of the present disclosure may operate conceptually similarly to a still frame or video stream, but instead of producing a flat image with contrast and color, the LiDAR module 22 may provide information regarding three-dimensional shapes of the environment 14 being scanned. Using time-of-flight, the LiDAR modules 22 are configured to measure the round-trip time taken for light to be transmitted, reflected from a surface, and received at a sensor near the transmission source. The light transmitted may be a laser pulse. The light may be sent and received millions of times per second at various angles to produce a matrix of the reflected light points. The result is a single measurement point for each transmission and reflection representing distance and a coordinate for each measurement point. When the LiDAR module 22 scans the entire "frame," or field of view 30, it generates an output known as a point cloud 24 that is a 3D representation of the features scanned.

In some examples, the LiDAR modules 22 of the present disclosure may be configured to capture the at least one point cloud 24 independent of visible-light illumination of the environment 14. For example, the LiDAR modules 22 may not require ambient light to achieve the spatial mapping techniques of the present disclosure. For example, the LiDAR module 22 may emit and receive IR or near-infrared (NIR) light, and therefore generate the at least one point cloud 24 despite visible-light conditions. Further, as compared to Radio Detection and Ranging (RADAR), the depth-mapping achieved by the LiDAR modules 22 may have greater accuracy due to the rate at which the LiDAR pulses may be emitted and received (e.g., the speed of light). Further, the three-dimensional mapping may be achieved without utilizing radio frequencies (RF), and therefore may limit RF certifications for operation. Accordingly, sensors incorporated for monitoring frequencies and magnitudes of RF fields may be omitted by providing the present LiDAR modules 22.

Figure 1B:
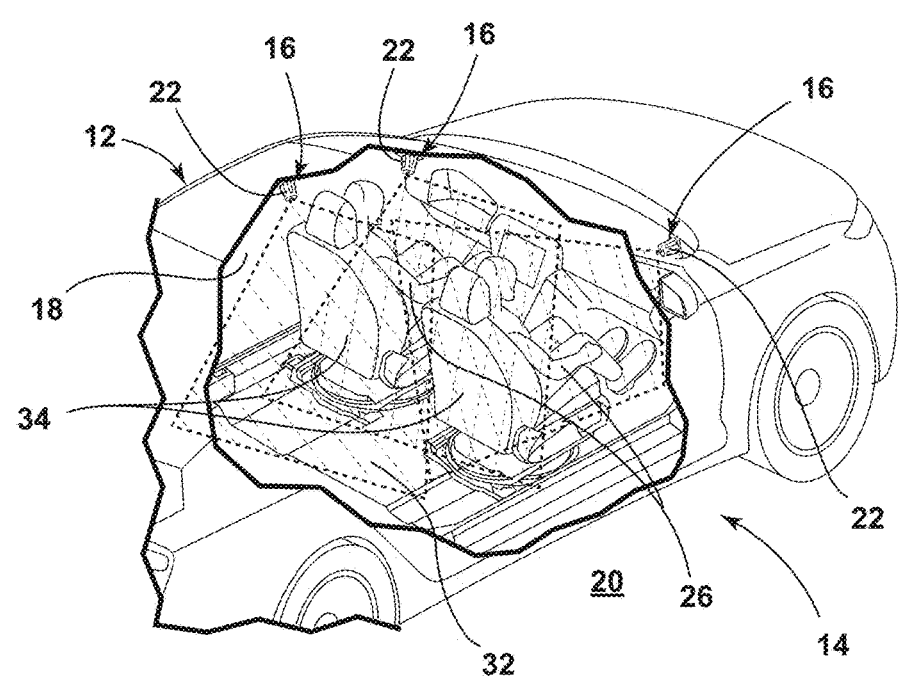
FIG. 1B is a perspective view of a car incorporating a detection system of the present disclosure in a passenger cabin of the car.

Referring now more particularly to FIGS. 1A and 1B, a plurality of the LiDAR modules 22 may be configured to monitor a compartment 28 of the vehicle 12. In the example illustrated in FIG. 1A, the LiDAR modules 22 are configured with a field of view 30 that covers the rear space of the vehicle 12, as well as the region exterior 20 to the vehicle 12. In this example, the region exterior 20 to the vehicle 12 is a space behind the vehicle 12 adjacent to an entry or an exit to the vehicle 12. In FIG. 1B, the plurality of LiDAR modules 22 are configured to monitor a front space of the vehicle 12, with the field of view 30 of one or more of the plurality of LiDAR modules 22 covering a passenger cabin 32 of the vehicle 12. As will be described further herein, it is contemplated that the plurality of LiDAR modules 22 may be in communication with one another to allow the at least one point cloud 24 captured from each LiDAR module 22 to be compared to one another to render a greater-accuracy representation of the environment 14. For example, and as depicted in FIG. 1A, the occupant 26 or another user may direct a mobile device 35 toward the environment 14 to generate an additional point cloud 24 from a viewing angle different than the field-of-views 30 of the LiDAR modules 22 of the vehicle 12. For example, the mobile device 35 may be a cellular phone having one of the LiDAR modules 22. In general, the time-of-flight sensors 16 disclosed herein may capture point clouds 24 of various features of the environment 14, such as seats 34, occupants 26, and various other surfaces or items present in the interior 18 or the region exterior 20 to the vehicle 12. As will further be discussed herein, the present system 10 may be operable to identify these features based on the at least one point cloud 24 and make determinations and/or calculations based on the identities, spatio-temporal positions of the features, and/or other related aspects of the features detected in the at least one point cloud 24.

Figure 2A:
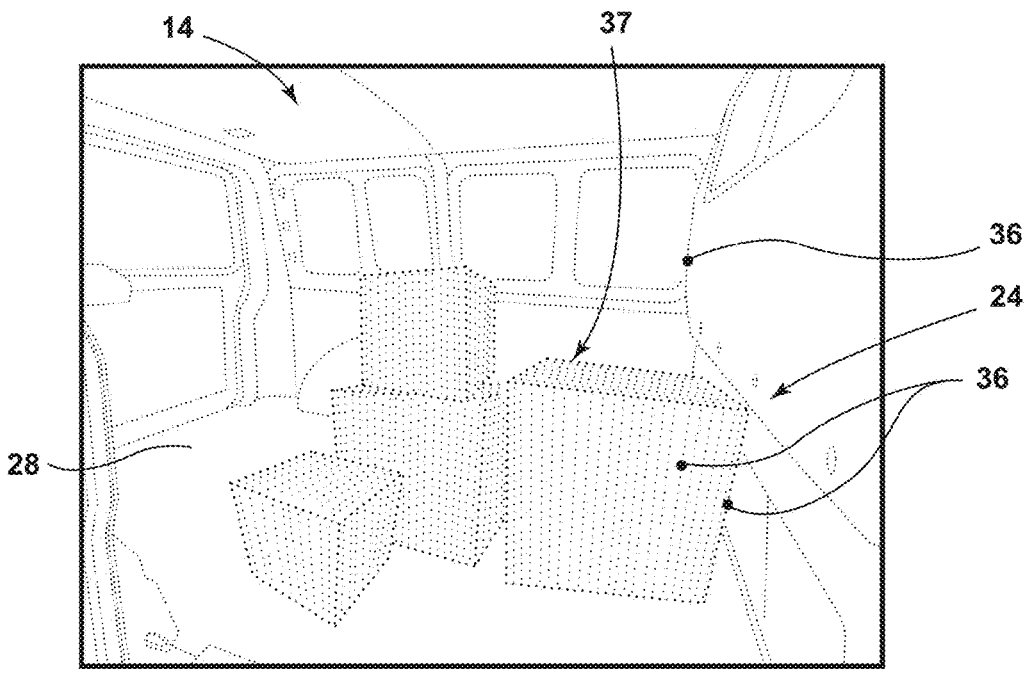
FIG. 2A is a representation of a point cloud generated by a time-of-flight sensor configured to monitor a rear space of a cargo van of the present disclosure.
Figure 2B:
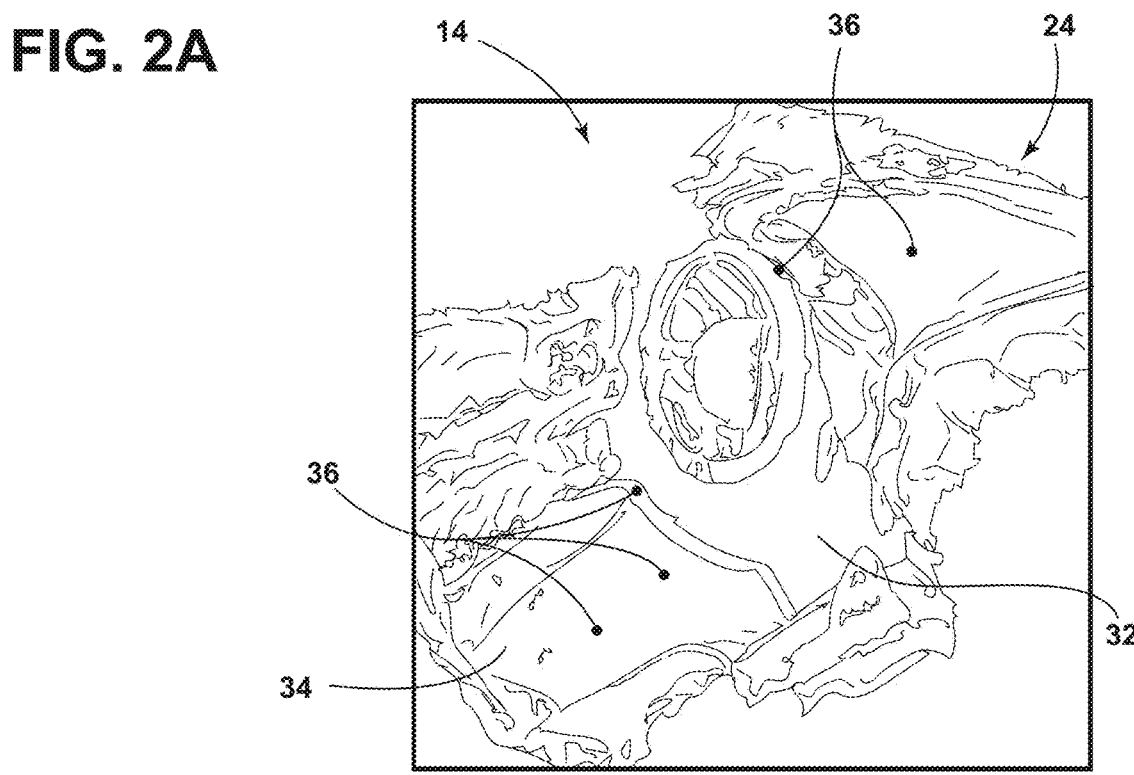
FIG. 2B is a representation of a point cloud generated by a time-of-flight sensor configured to monitor a passenger compartment of a vehicle of the present disclosure.

Referring now to FIGS. 2A and 2B, representations of at least one point cloud 24 generated from the LiDAR modules 22 in the interiors 18 of the vehicles 12 of FIGS. 1A and 1B, respectively, are presented to illustrate the three-dimensional mapping of the present system 10. For example, the depictions of the at least one point cloud 24 may be considered three-dimensional images constructed by the LiDAR modules 22 and/or processors in communication with the LiDAR modules 22. Although the depictions of the at least one point clouds 24 illustrated in FIGS. 2A and 2B may differ in appearance, it is contemplated that such difference may be a result of averaging depths of the points 36 of each point cloud 24 to render a surface (FIG. 2B) as opposed to individual dots (FIG. 2A). The underlying 3D data may be generated the same way in either case.

Still referring to FIGS. 2A and 2B, each point cloud 24 includes the three-dimensional data (e.g., a three-dimensional location relative to the LiDAR module 22) for the various features in the interior 18. For example, the at least one point cloud 24 may generate 3D mapping of the occupants 26 or cargo 37 in the interior 18. The three-dimensional data may include the rectilinear coordinates, with XYZ coordinates, of various points 36 on surfaces or other light-reflective features relative to the LiDAR module 22. It is contemplated that the coordinates of each point 36 may be virtually mapped to an origin point other than the LiDAR module 22, such as a center of mass of the vehicle, a center of volume of the compartment 28 being monitored, or any other feasible origin point. By obtaining the three-dimensional data of the various features in the interior 18 and, in some cases, the region exterior 20 to the vehicle 12, the present system 10 may provide for enhanced monitoring methods to be performed without complex imaging methods, such as those incorporating stereoscopic imagers or other three-dimensional monitoring devices that may require higher computational power or decreased efficiencies.

Figure 3:
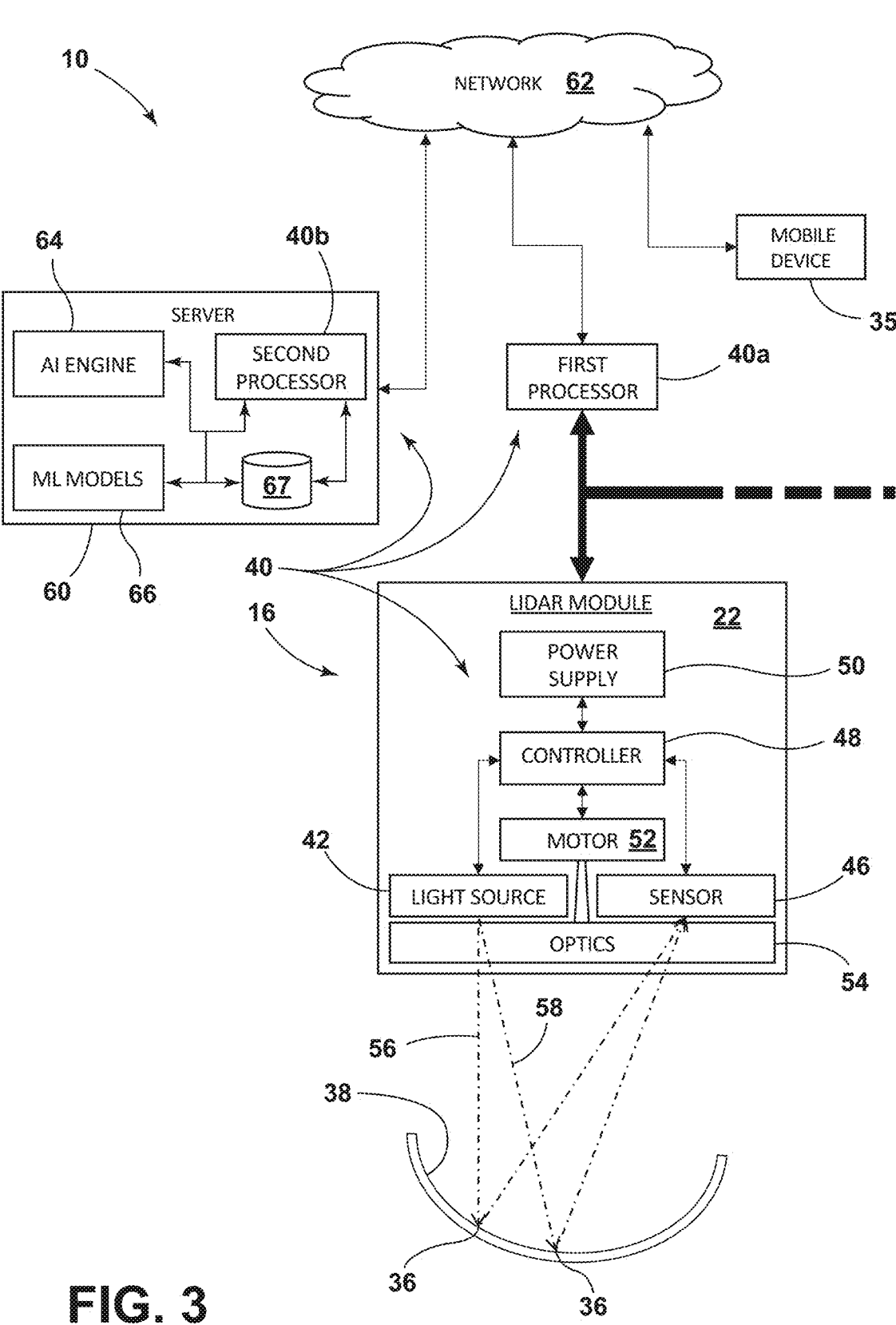
FIG. 3 is a block diagram of an exemplary detection system incorporating light detection and ranging.

Referring now to FIG. 3, at least a portion of the present detection system 10 is exemplarily applied to a target surface 38, such as to the cargo 37 or other surfaces in the environment 14 of the vehicle 12. The system 10 may include processing circuitry 40, which will be further discussed in relation to the proceeding figures, in communication with one or more of the time-of-flight sensors 16. In the present example, the time-of-flight sensors 16 include the LiDAR modules 22 each having a light source 42, or emitter, and a sensor 46 configured to detect reflection of the light emitted by the light source 42 off of the target surface 38. A controller 48 of the LiDAR module 22 is in communication with the light source 42 and the sensor 46 and is configured to monitor the time-of-flight of the light pulses emitted by the light source 42 and returned to the sensor 46. The controller 48 is also in communication with a power supply 50 configured to provide electrical power to the controller 48, the light source 42, the sensor 46, and a motor 52 that is controlled by the controller 48. In the present example, the LiDAR module 22 incorporates optics 54 that are mechanically linked to the motor 52 and are configured to guide the light pulses in a particular direction. For example, the optics 54 may include lenses or mirrors that are configured to change an angle of emission for the light pulses and/or return the light pulses to the sensor 46. For instance, the motor 52 may be configured to rotate a mirror to cause light emitted from the light source 42 to reflect off of the mirror at different angles depending on the rotational position of the motor 52.

In some examples, the optics 54 may include a first portion associated with the source 42 and a second portion associated with the sensor 46. For example, a first lens, which may move in response to the motor 52, may be configured to guide (e.g., collimate, focus) the light emitted by the source 42, and a second lens, which may be driven by a different motor or a different connection to the motor 52, may be configured to guide the light reflected off the target surface 38 and returned to the sensor 46. Accordingly, the general configuration of the LiDAR module 22 may incorporate a single housing having different sets of optics or a plurality of housings with different optics. For example, the source 42 may be located in a first housing of the LiDAR module 22, the sensor 46 may be located in a second housing separate from or spaced from the first housing. In this way, each of the LiDAR modules 22 may refer to any emitter/receiver combination system that emits LiDAR pulses and receives the LiDAR pulses either at a common location in the vehicle 12 or at different locations in the vehicle 12.

The light emitted and received by the present LiDAR modules 22 may have a wavelength in the range of between approximately 780 nanometers (nm) and 1700 nm. In some examples, the wavelength of the LiDAR is preferably in the range of between 900 nm and 1650 nm. In other examples, the wavelength of the LiDAR is preferably between 1500 nm and 1650 nm. In some examples, the wavelength of the LiDAR is preferably at least 1550 nm. It is contemplated that the particular wavelength/frequency employed by the LiDAR modules 22 may be based on an estimated distance range for capturing the depth information. For example, for shorter ranges (e.g., between 1 m and 5 m) the LiDAR may operate with a greater wavelength of light (e.g., greater than 1000 nm). The LiDAR modules 22 of the present disclosure may be configured to output light, in the form of a laser, at a wavelength of at least 1550 nm while the motor 52 rotates the optics 54 to allow mapping an area. In some examples, the LiDAR modules 22 of the present disclosure are configured to emit light having a wavelength of at least 1650 nm. Due to the relatively short distances scanned by the present LiDAR modules 22 (e.g., between one and five meters), such relatively low infrared (IR) or near-infrared (NIR) may be employed to achieve the three-dimensional spatial mapping via the at least one point cloud 24 with low power requirements. The present LiDAR modules 22 may be either single point-and-reflect modules or may operate in a rotational mode, as described above. In rotational mode, the LiDAR module 22 may measure up to 360 degrees based on the rate of rotation, which may be between 1 and 100 Hertz or may be at least 60 rotations per minute (RPM) in some examples.

In the example depicted in FIG. 3, the time-of-flight for a first pulse of light 56 emitted by the light source 42 and returned to the sensor 46 may be less than a second time-of-flight for a second light pulse emitted by the light source 42 returned to the sensor 46. For example, the first pulse of light 56 may travel a shorter distance than the second pulse of light 58 due to a difference in depth, height, or width of the corresponding reflection point 36 on the target surface 38. In this way, the LiDAR module 22 may generate the at least one point cloud 24 to be representative of the environment 14 (e.g., the target surface 38 in the present example) in three dimensions.

The processing circuitry 40 of the present disclosure may be provided to amalgamate the point cloud 24 from each of a plurality of the LiDAR modules 22 and process the coordinates of the features to determine an identity of the features, as well as to perform other processing techniques that will be further described herein. The processing circuitry 40 may include a first processor 40a local to the vehicle 12 and a second processor 40b remote from the vehicle 12. Further, the processing circuitry 40 may include the controller 48 of the LiDAR module 22. In some examples, the controller 48 may be configured to generate or determine the at least one point cloud 24 and/or point cloud data, and the first processor 40a may be configured to receive the at least one point cloud 24 from each LiDAR module 22 and compile each point cloud 24 of a common scene, such as the environment 14, to generate a more expansive or more accurate point cloud 24 of the environment 14.

The second processor 40b, which may be a part of a remote server 60 and in communication with the first processor 40a, via a network 62, may be configured to perform various modifications and/or mapping of the at least one point cloud 24 to target three-dimensional image data for the environment 14. For example, the server 60 may include an artificial intelligence (AI) engine 64 configured to train machine learning models 66 based on the point cloud data captured via the LiDAR modules 22 and/or historical data previously captured by the time-of-flight sensors 16. The second processor 40b may be in communication with the AI engine 64, as well as in communication with a database 67 configured to store the target point cloud data and/or three-dimensional image information. Accordingly, the server 60 may incorporate a memory storing instructions that, when executed by the processor, causes the processing circuitry 40 to compare the at least one point cloud 24 to point cloud data corresponding to target conditions of the interior 18 and/or the region exterior 20 to the vehicle 12. In this way, the detection system 10 may employ the processing circuitry 40 to perform advanced detection techniques and to communicate with subsystems of the vehicle 12, as will be described in the proceeding figures. In this way, the detection system 10 may be employed in tandem or in conjunction with other operational parameters for the vehicle 12. For example, the detection system 10 may be configured for communicating notifications to the occupants 26 of alert conditions, controlling the various operational parameters in response to actions detected in the interior 18, activating or deactivating various subsystems of the vehicle 12, or interacting with any vehicle systems to effectuate operational adjustments.

Figure 4:
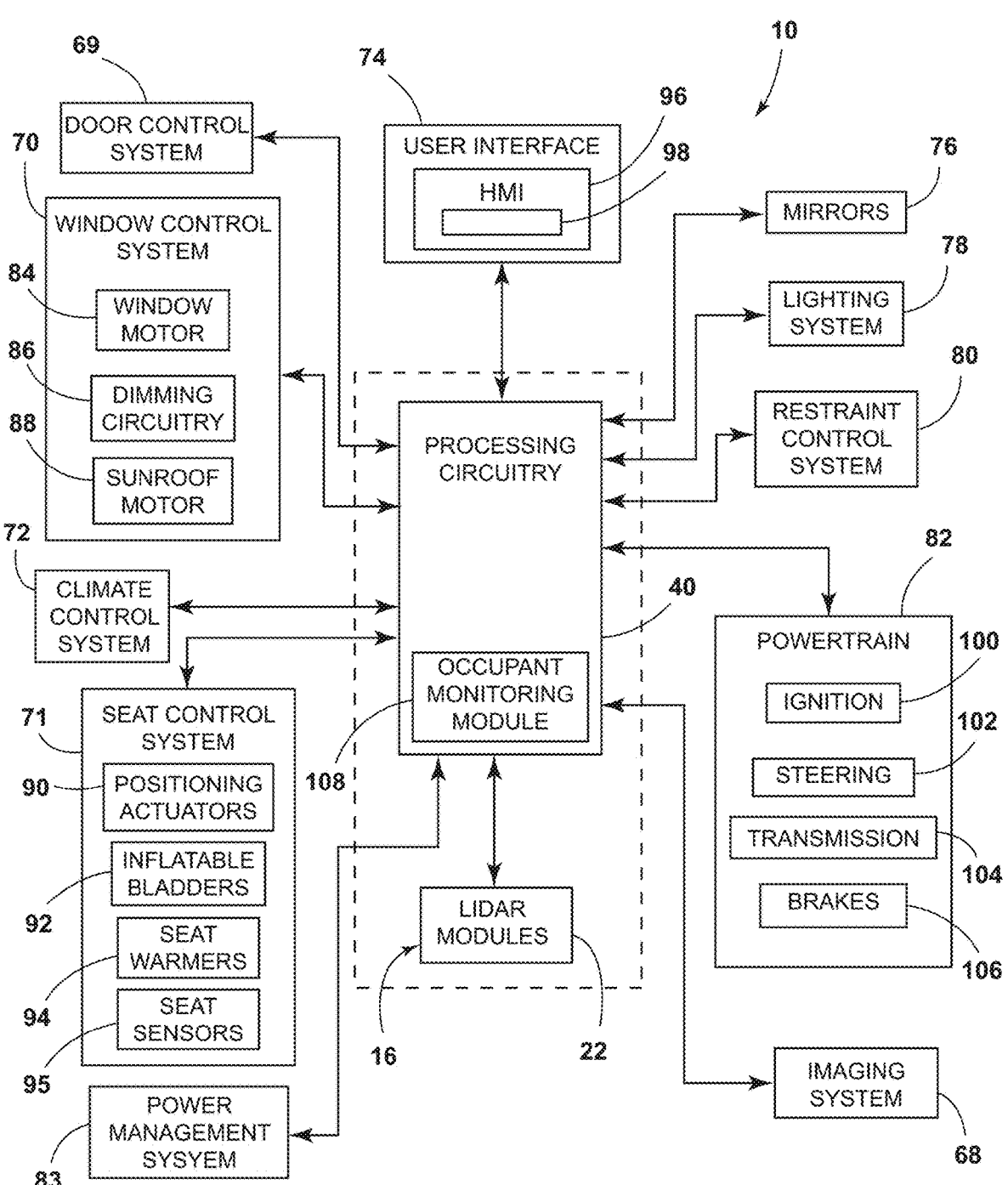
FIG. 4 is a block diagram of an exemplary detection system for a vehicle.

Referring now to FIG. 4, the detection system 10 may incorporate or be in communication with various systems of the vehicle 12 (e.g., vehicle systems). For example, the processing circuitry 40 may be configured to communicate with an imaging system 68 that includes imaging devices, such as cameras (e.g., red-, green-, and blue-pixel (RGB) or IR cameras). The processing circuitry 40 may further be in communication with other vehicle systems, such as a door control system 69, a window control system 70, a seat control system 71, a climate control system 72, a user interface 74, mirrors 76, a lighting system 78, a restraint control system 80, a powertrain 82, a power management system 83, or any other vehicle systems. Communication with the various vehicle systems may allow the processing circuitry 40 to transmit and receive signals or instructions to the various vehicle systems based on processing of the at least one point cloud 24 captured by the time-of-flight sensors 16. For example, when the processing circuitry 40 identifies a number of occupants 26 in the vehicle 12 based on the at least one point cloud 24, the processing circuitry 40 may communicate an instruction to adjust the seat control system 71 and/or the climate control system 72. In another non-limiting example, the processing circuitry 40 may receive information or signals from the lighting system 78 and control operation of the time-of-flight sensors 16 based on the information from the lighting system 78. Accordingly, the processing circuitry 40 may control, or communicate instructions to control, the time-of-flight sensors 16 based on information from the vehicle systems and/or may communicate signals or instructions to the various vehicle systems based on information received from the time-of-flight sensors 16.

The window control system 70 may include a window motor 84 for controlling a position of a window of the vehicle 12. Further, the window control system 70 may include dimming circuitry 86 for controlling an opacity and/or level of light transmitted between the interior 18 of the vehicle 12 and the region exterior 20 to the vehicle 12. One or more sunroof motors 88 may be provided with the window control system 70 for controlling closing and opening of a sunroof panel. It is contemplated that other devices may be included in the window control system 70, such as window locks, window breakage detection sensors, and other features related to operation of the windows of the vehicle 12. By providing communication between the window control system 70 and processing circuitry 40 of the present disclosure, the window control system 70 may be configured to adjust one or more of its features based on conditions determined or detected by the processing circuitry 40 based on the at least one point cloud 24. Similarly, the window control system 70 may transmit one or more signals to the processing circuitry 40, and the processing circuitry 40 may control operation of the time-of-flight sensors 16 based on the signals from the window control system 70.

The climate control system 72 may include one or more heating and cooling devices, as well as vents configured to distribute heated or cooled air into the interior 18 of the vehicle 12. Although not specifically enumerated in FIG. 4, the climate control system 72 may be configured to actuate a vent to selectively limit and allow heated air or cooled air to circulate in the interior 18 of the vehicle 12. Further, the climate control system 72 may be configured to operate heating, ventilation, and air conditioning (HVAC) systems to recirculate air or to vent air to the region exterior 20 to the vehicle 12.

The seat control system 71 may include various positioning actuators 90, inflatable bladders 92, seat warmers 94, and/or other ergonomic and/or comfort features for seats 34 in the vehicle 12. For example, the seat control system 71 may include motors configured to actuate the seat 34 forward, backward, side to side, or rotationally. Both a backrest of the seat 34 and a lower portion of the seat 34 may be configured to be adjusted by the positioning actuators 90. The inflatable bladders 92 may be provided within the seat 34 to adjust a firmness or softness of the seat 34, and seat warmers 94 may be provided for warming cushions in the seat 34 for comfort of the occupants 26. In one non-limiting example, the processing circuitry 40 may compare the position of the seats 34 based on seat sensors 95, such as position sensors, occupancy detection sensors, or other sensors configured to monitor the seats 34, to the point cloud data captured by the time-of-flight sensors 16 in order to verify or check an estimated seat position based on the point cloud data. In other examples, the processing circuitry 40 may communicate one or more signals to the seat control system 71 based on body pose data identified in the at least one point cloud 24. In yet further examples, the processing circuitry 40 may be configured to adjust an operational parameter of the time-of-flight sensors 16, such as a scanning direction, a frequency of the LiDAR module 22, or the like, based on the position of the seats 34 being monitored by the time-of-flight sensors 16.

The user interface 74 may include a human-machine interface (HMI) 96 and/or may include audio devices, such as microphones and/or speakers, mechanical actuators, such as knobs, buttons, switches, and/or a touchscreen 98 incorporated with the HMI 96. The human-machine interface 96 may be configured to present various digital objects representing buttons for selection by the user via, for example, the touchscreen 98. In general, the user interface 74 may communicate with the processing circuitry 40 to activate or deactivate the time-of-flight sensors 16, adjust operational parameters of the time-of-flight sensors 16, or control other aspects of the time-of-flight sensors 16. Similarly, the processing circuitry 40 may be configured to communicate instructions to the user interface 74 to present information and/or other data related to the detection and/or processing of the at least one point cloud 24 based on the time-of-flight sensors 16. It is further contemplated that the mobile device 35 may incorporate a user interface 74 to present similar options to the user at the mobile device 35.

Still referring to FIG. 4, other vehicle systems include the mirrors 76, the lighting system 78, and the restraint control system 80. These other vehicle systems may also be adjusted based on the at least one point cloud 24 generated by the time-of-flight sensors 16 and processed by the processing circuitry 40. Additionally, subcomponents of these systems (e.g., sensors, processors) may be configured to send instructions or data to the processing circuitry 40 to cause the processing circuitry 40 to operate the time-of-flight sensors 16 in an adjusted operation. For example, the processing circuitry 40 may be configured to deactivate the time-of-flight sensors 16 in response to the lighting system 78 detecting adequate lighting to allow for visible light and/or IR occupant monitoring. In some examples, the processing circuitry 40 may communicate an instruction to adjust a position of the mirrors 76 based on the at least one point cloud 24. For example, the at least one point cloud 24 may demonstrate an event, such as an orientation of a driver, a position of another vehicle in the region exterior 20 to the vehicle 12, or any other positional feature, and generate a signal to the mirrors 76 (or associated positioning members) to move the mirrors 76 to align a view with the event.

Referring again to FIG. 4, the vehicle 12 may include the powertrain 82 that incorporates an ignition system 100, a steering system 102, a transmission system 104, a brake system 106, and/or any other system configured to drive the motion of the vehicle 12. In some examples, the at least one point cloud 24 captured by the time-of-flight sensors 16 may be processed by the processing circuitry 40 to determine target steering angles, rates of motion or speed changes, or other vehicle operations for the powertrain 82, and communicate the target operations to the powertrain 82 to allow for at least partially autonomous control over the motion of the vehicle 12. Such at least partially autonomous control may include fully autonomous operation or semiautonomous operation of the vehicle 12. For example, the processing circuitry 40 may communicate signals to adjust the brake system 106, the ignition system 100, the transmission system 104, or another system of the powertrain 82 to stop the vehicle 12 or move the vehicle 12.

The processing circuitry 40 may further include an occupant monitoring module 108 that may communicate with any of the vehicle systems described above, as well as the time-of-flight sensors 16 of the present disclosure. The occupant monitoring module 108 may be configured to store various algorithms for detecting aspects related to the occupants 26. For example, the algorithms may be executed to monitor the interior 18 of the vehicle 12 to identify occupants 26 in the vehicle 12, a number of occupants 26, or other occupancy features of the interior 18 using the point cloud data and/or video or image data captured by the imaging system 68. Similarly, various seat sensors 95 of the seat control system 71, heating or cooling sensors that detect manual manipulation of the vents for heating or cooling control for the climate control system 72, inputs to the window control system 70, or any other sensor of the vehicle systems previously described may be processed in the occupant monitoring module 108 to detect positions of occupants 26 in the vehicle 12, conditions of occupants 26 in the vehicle 12, states of occupants 26 in the vehicle 12, or any other relevant occupancy features that will be described herein. The processing circuitry 40 may also include various classification algorithms for classifying objects detected in the interior 18, such as for the cargo 37, mobile devices 35, animals, and any other living or nonliving item in the interior 18. Accordingly, the processing circuitry 40 may be configured to identify an event in the interior 18 or predict an event based on monitoring of the interior 18 by utilizing information from the other vehicle systems.

In general, the detection system 10 may provide for spatial mapping of the environment 14 of the vehicle 12. For example, the LiDAR modules 22 may detect the position, in three-dimensional space, of objects, items, or other features in the interior 18 or the region exterior 20 to the vehicle 12. Such positions, therefore, include depth information of the scene captured by the LiDAR module 22. As compared to a two-dimensional image captured by a camera, the at least one point cloud 24 generated by the time-of-flight sensor 16 allows for more efficient determination of how far the features are from the LiDAR module 22 and from one another. Thus, complex image analysis techniques involving pixel analysis, comparisons of RGB values, or other tech-niques to estimate depth may be omitted due to utilization of the ToF sensors 16. Further, while multiple imaging devices from different angles of a common scene (e.g., a stereo-scopic imager) may allow for more accurate estimation of depth information than those produced by a single camera, complex data processing techniques may be required for multiple cameras to be employed to gather the depth infor-mation. Further, such multi-camera systems may require additional weight, packaging volume, or other inefficiencies relative to the time-of-flight sensors 16 of the present disclosure.

Accordingly, the detection system 10 may be computa-tionally-efficient and/or power-efficient relative to two-di-mensional and three-dimensional cameras for determining positional information. Further, other time-of-flight sensing techniques, such as RADAR, while providing depth infor-mation, may present certification issues based on RF requirements and may be less accurate than the present LiDAR modules 22. Further, a number of cameras used for monitoring the environment 14 may be reduced, various presence detectors (vehicle seat sensors 95) may be omitted, and other sensors configured to determine positional infor-mation about the environment 14 may be omitted due to the precision of the LiDAR. Thus, a solution may be provided by the detection system 10 by reducing the number of sensors required to monitor various aspects of the environ-ment 14.

Referring now to FIGS. 5-8, in one example, the detection system 10 may be configured for monitoring one or more events in the vehicle 12. As previously described, the detection system 10 includes the time-of-flight sensor 16 configured to generate the point cloud 24 representing the interior 18 of the vehicle 12. The point cloud 24 includes three-dimensional positional information of the interior 18. A camera 120 is configured to capture image data 122 representing the interior 18 of the vehicle 12. The processing circuitry 40 is in communication with the time-of-flight sensor 16 and the camera 120. The processing circuitry 40 is configured to process the image data 122 from the camera 120 in a first operational mode, process the point cloud 24 from the time-of-flight sensor 16 in a second operational mode, detect, based on either of the image data 122 or the point cloud 24, the occupant 26 of the vehicle 12, detect an indication from the occupant 26 to disable the first opera-tional mode, and selectively operate between the first and second operational modes based on at least one of the image data 122 and the indication.

Figure 5:
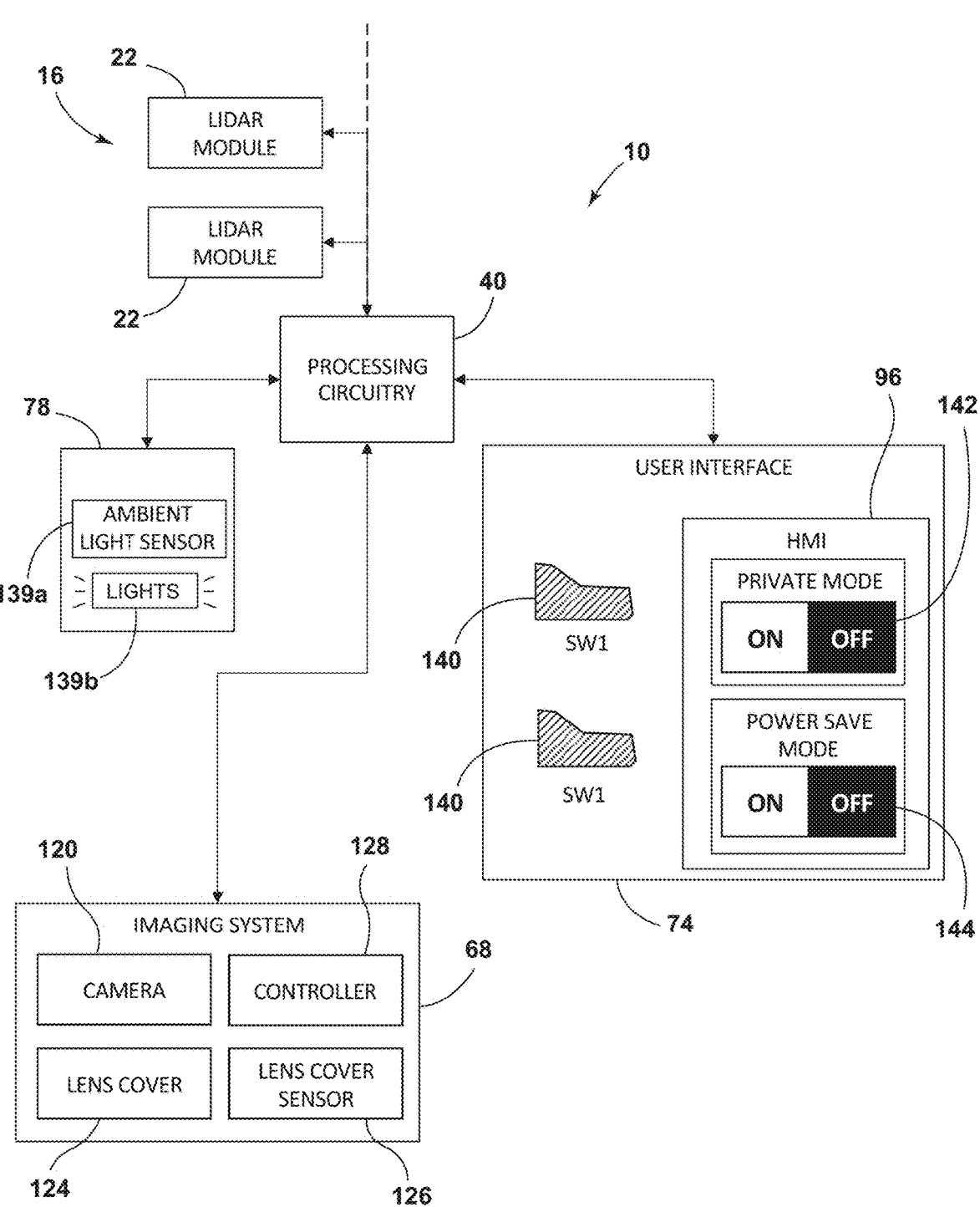
FIG. 5 is a block diagram of an exemplary detection system for a vehicle.
Figure 6:
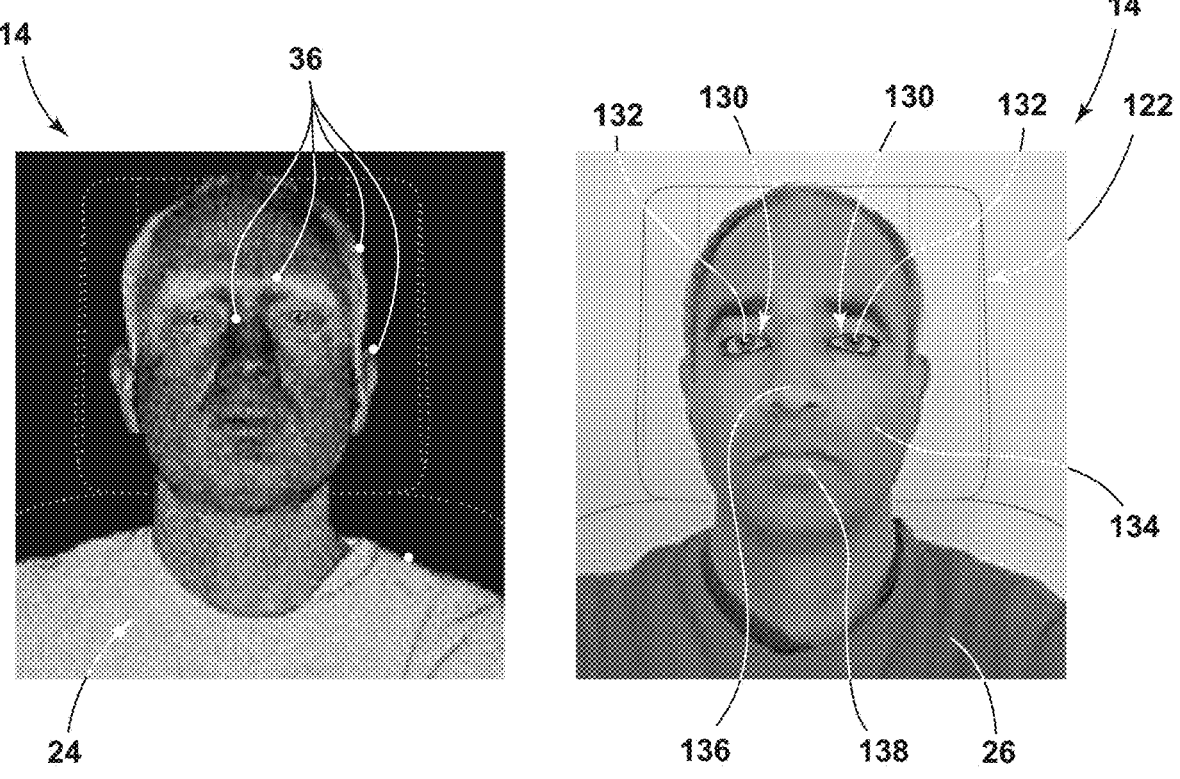
FIG. 6 depicts a comparison of a point cloud generated by a time-of-flight sensor to image data from a camera with each directed to a common scene of an occupant in a vehicle.

Referring now to FIGS. 5-6 more particularly, the pro-cessing circuitry 40 may be in communication with one or more of the time-of-flight sensors 16 (e.g., LiDAR modules 22), the lighting system 78, and the user interface 74, as previously described, as well as with the camera 120 of the imaging system 68. The imaging system 68 may include the camera 120, a lens cover 124 for selectively covering a lens of the camera 120, a cover detector 126 for detecting the presence of the lens cover 124 over the lens of the camera 120 or any other obstruction for the camera 120 over or in front of the lens of the camera 120, and a controller 128 configured to operate the camera 120 to capture the image data 122. Thus, similar to communication between the processing circuitry 40 and the controller 48 for the LiDAR modules 22, the processing circuitry 40 may be in commu-nication with the controller 128 for the imaging system. In some examples, various tasks performed by either the con-troller 128 of the imaging system or the controller 48 of the LiDAR module 22 may be offloaded to other processors of the processing circuitry 40 (e.g., the first or second processors 40a, 40b), or vice versa.

In general, the processing circuitry 40 may be configured to selectively activate either or both of the time-of-flight sensors 16 and the imaging system 68 in order to selectively gather the point clouds 24 and image data 122, respectively. For example, the processing circuitry 40 may toggle between capturing image data 122 and capturing the point cloud 24, or may capture both the point cloud 24 and image data 122 simultaneously. Various parameters that determine which, if any, of the time-of-flight sensors 16 or the cameras 120 are activated will be further discussed herein and may include a user setting, a lighting condition in the interior 18, whether the lens of the camera(s) 120 are covered, whether a power saving mode is on or off, or whether any other function that allows selective operation of either of the camera 120 or the time-of-flight sensors 16 is activated or deactivated. In one example, the processing circuitry 40 is configured to detect a privacy condition for the interior 18 based on processing of the image data 122 and control operation between the first operational mode and the second operational mode based on detection of the privacy condition.

With continued reference to FIGS. 5 and 6, the detection system 10 may be configured to operate the time-of-flight sensors 16 and/or the cameras 120 to capture different aspects of the interior 18 of the vehicle 12. The occupant 26 in the field of view 30 of the camera 120 and the time-of-flight sensor 16 may have an identity to which various settings in the vehicle 12 are mapped. Settings may include target positional data for the seating, target heating or cooling parameters for the climate control system 72, target seating configurations for the vehicle 12, or any target setting for the interior 18 of the vehicle 12. The identity of the occupant 26 may refer to a particular specific identity or a group identity for the occupant 26. For example, the specific identity may be a name, a height, a weight, color of the eye 130 of the occupant 26, a hair color, and/or other specific identity verification features of the occupant 26 that correlates to a particular individual. The general identity may refer to the height and weight of the occupant 26 and not include the particular aspects related to personal identity. It is contemplated that the detection system 10 may be configured to selectively monitor the interior 18 to capture the specific identity of the occupant 26 or to operate without capturing the specific identity of the occupant 26 or other occupants 26 in the vehicle 12. Selective operation of the time-of-flight sensor 16 or the camera 120 may be determined by the processing circuitry 40 based on various conditions, as will be described below.

Still referring to FIGS. 5 and 6, one example in which operation of the camera 120 and the time-of-flight sensors 16 is determined by the processing circuitry 40 includes determining the privacy condition for the interior 18 based on the image data 122 captured by the camera 120. For example, the camera 120 may be configured to produce pixel data that includes red, green, and blue (RGB) color information that may be processed by the controller 128 and/or the processing circuitry 40. The processing circuitry 40 may perform various image processing techniques, such as edge detection, object identification, biometric feature analysis, and other image processing techniques to detect and identify the occupants 26. In such examples, processing the image data 122 may result in determination of the specific personal identity of the occupant 26, such as the personal identity of the occupant 26. For example, with particular reference to FIG. 6, the image data 122 may reveal a color of the eye 130 of the occupant 26, a shape or distinct pattern marking of an iris 132 of the eye 130, a shape of a face 134, or other features of the occupant 26 in order to determine the personal identity of the occupant 26. For example, computer vision algorithms may be applied to the image data 122 to accurately estimate the portions of the user's body, facial features of the occupant 26 (e.g., nose 136, mouth 138), contents of items in the vehicle 12, arrangements of other belongings in the vehicle 12, and other information concerning the privacy of the occupants 26. When the system 10 employs these imaging techniques, the identity information processed by the processing circuitry 40 may therefore have access to a first level of privacy information more specific than a second level of privacy information resulting from the point cloud 24. It is contemplated that processing of the image data 122 in either of the controller 128 or the processing circuitry 40 may include processing image data 122 in one or more neural networks that are trained to handle one or more cameras 120 and may allow for the various edge detection and identification algorithms previously described. Thus, operation of the imaging system 68 relative to the time-of-flight sensors 16 may result in lower efficiencies for in-cabin monitoring. Further, in addition to incorporating more complex processing features for processing the image data 122 as opposed to the point clouds 24, the imaging system 68 may have greater electrical power requirements than the electrical power requirements for the time-of-flight sensors 16.

In some examples, operation of the camera 120 may require a first power consumption level in the first operational mode, and the time-of-flight sensor 16 may require a second power consumption level in the second operational mode. In this example, the processing circuitry 40 may determine the selective operation between the first and second operation modes based further on the comparison of the first and second power consumption levels. For example, when a power saving mode is active (as will be described further in reference to FIG. 8), the processing circuitry 40 may deactivate the first operation mode and activate the second operation mode in certain scenarios detailed below. For example, a signal from the power management system 83 to the processing circuitry 40 may be communicated to cause the processing circuitry 40 to enter the power saving mode. For example, the power management system 83 may include one or more batteries configured to power some or all of the vehicle systems. Upon detection of electrical power consumption exceeding a threshold power consumption level, the power management system 83 may send a signal to the processing circuitry 40 to reduce power consumption. In some examples, the signal may be generated due to low battery power for an electric vehicle or a semi-electric vehicle. In some examples, the first power consumption level is between five and 100 times the second power consumption level. In other examples, the first power consumption level is substantially greater than the second power consumption level (e.g., 10% higher, 50% higher, 100% higher, 500% higher).

In addition to the requirements for complex image processing and higher power consumption, operation of the imaging system 68 may result in reduced latency for data acquisition of the environment 14 relative to data acquisition by the time-of-flight sensors 16. For example, determining a position of the occupant 26 may be, in general, more easily determined via the point cloud 24 as opposed to processing of the image data 122. Because the point cloud 24 itself may include the three-dimensional information and not require additional processing of pixel values to estimate depth, operation of the time-of-flight sensors 16 may be activated in low power requirements when the privacy condition is detected, when there are low lighting conditions in the interior 18, when the lens of the imaging device is discovered, or whenever else desired by the occupant 26 via a user input. Thus, the detection system 10 may allow for dynamic in-cabin monitoring. In addition to allowing for simpler processing, employing LiDAR with the time-of-flight sensors 16 may provide for greater accuracy and precision in determining a position, motion, and other kinematic quality of the occupant 26. Thus, the processing circuitry 40 may be configured to more efficiently predict future movements or position of the occupants 26 based on the point cloud 24 as opposed to the image data 122, and the personal identity of occupants 26 may be limited.

Referring now more particularly to FIG. 6, it is shown that the personal identity of the occupant 26 may be determined based on the image data 122 captured by the camera 120, whereas determining the personal identity of the occupant 26 based on the point cloud 24 may be limited. For example, the eyes 130 of the occupant 26 may be identified in the image data 122, including qualities of the iris 132, which may be used to authenticate a user and determine the specific personal identity. Conversely, the point cloud 24 may reveal general position or depth information based on light reflecting off of surfaces. In this way, the point cloud 24 may map the geometries of the occupant 26 without detailing the characteristics of the face 134 or body. Thus, established personal identification information policies may not be required for operation of the time-of-flight sensors 16 in some examples. For example, images revealing an identity of particular occupants (children) may be limited from electronic storage by utilizing the LiDAR.

Referring again to FIGS. 5 and 6, the processing circuitry 40 may be configured to classify the occupant 26 as a child based on at least one of the image data 122 and the point cloud 24. Based on the classification of the occupant 26 as a child, the processing circuitry 40 may disable the first operational mode and enable the second operational mode. It is contemplated that detection of the child may be the privacy condition, but other privacy conditions may also be present. In these examples, the processing circuitry 40 may be configured to disable the first operational mode in response to detection of the privacy condition and enable the second operational mode in response to detection of the privacy condition. Thus, the processing circuitry 40 may operate the time-of-flight sensors 16 when the privacy condition is detected to limit storage of and/or continued monitoring of image data 122 revealing identification information.

The processing circuitry 40 may further be configured to periodically enable the first operational mode at first intervals $T_1$ (FIG. 8) while operating in the second operational mode. For example, the processing circuitry 40 may enable the camera 120 briefly every number of seconds (e.g., 10 seconds, 60 seconds, etc.) to determine whether the privacy condition is still present in the interior 18. The processing circuitry 40 may further be configured to process the image data 122 captured during second intervals $T_2$ (FIG. 8) to determine a change in the privacy condition. For example, if a child is detected in the interior 18, the processing circuitry 40 may operate in the second operational mode, periodically activate the first operational mode until the child is no longer detected in the interior 18, then deactivate the second operational mode and activate the first operational mode. In some examples, when periodically operating in the first operational mode, images captured by the camera may not be stored by the detection system 10.

As illustrated in FIG. 5, the user interface 74 may be configured to communicate an instruction to present an option to enable the first operational mode at the user interface 74 based on determining the change in the privacy condition. For example, once the child is no longer detected in the interior 18, the HMI 96 may present a question to return to monitoring in the second operational mode. The occupant 26 may select to either remain in the first operational mode or the second operational mode, and the processing circuitry 40 may update the operational mode based on the selection by the occupant 26. In this example, the processing circuitry 40 may be configured to be manual as opposed to automatic, as the processing circuitry 40 may not automatically revert to operating in the first operational mode but instead rely on further user interaction to do so.

Still referring to FIGS. 5 and 6, the processing circuitry 40 may further be configured to determine the lighting condition of the interior 18 based on the image data 122 and operate in the second operational mode based on the lighting condition. The lighting condition may be determined by the image data 122 presenting all dark pixels indicative of the lens being covered, a signal from the cover detector 126 indicating that the cover overlays the lens, identification of an obstruction over the lens, darkness in the interior 18 (e.g., nighttime, driving through a tunnel, etc.) or another low lighting condition for the interior 18. In such low lighting conditions, the processing circuitry 40 may operate in the second operational mode, and thus continue to capture the three-dimensional information of the interior 18 without the need for visible light illumination. In other examples, the processing circuitry 40 may detect low lighting conditions based on an ambient light sensor 139a and/or control a light 139b of the lighting system 78 to illuminate the environment 14. It is also contemplated that changing operation to the second operational mode from the first operational mode may be effected in response to being unable to identify the occupant 26 based on the image data 122 for any other reason (e.g., covering of the face 134 or other identifying features of the occupant 26), patterned lighting conditions in the interior 18 that limits recognition algorithms, or any other condition that limits determining the identity of the occupant 26. Stated differently, if operating the imaging system 68 is ineffective to achieve desired identification functions, the processing circuitry 40 may activate the time-of-flight sensors 16. In some examples, the processing circuitry 40 may further maintain operation of the cameras 120 in tandem with operation of the time-of-flight sensors 16. In other examples, the processing circuitry 40 may deactivate the imaging system and activate the time-of-flight sensors 16 in response to an ineffective condition of the imaging system 68 (e.g., an ineffective condition of a monitoring algorithm). Thus, the processing circuitry 40 may determine an ineffective condition of the vehicle monitoring algorithms for the interior 18 based on the image data 122, and enable the second operational mode based on the ineffective condition of the vehicle monitoring algorithms.

With particular reference to FIG. 5, the user interface 74 may include one or more switches 140 that may be manipulated by the occupant 26 to cause the processor to operate in a particular monitoring method. Similarly, the HMI 96 may be configured to present a privacy mode option (e.g., a first option 142) and/or a power save option (e.g., a second option 144). The switches 140 may control, in addition, or alternatively, selection between the power saving mode and/or the privacy mode. Accordingly, a user, such as the occupant 26, may control the particular operational modes selected by the processing circuitry 40 using the switches 140 or the first and second options 142, 144 on the HMI 96. In general, activation of the power saving mode may cause the processing circuitry 40 to operate in the second operational mode despite the identity of the occupants 26 being determined based on the image data 122. Thus, the power saving mode may cause the processing circuitry 40 to choose to select a lower power monitoring setting based, for example, on a request from the power management system 83 to reduce power consumption.

In some examples, the first and second options 142, 144 presented on the HMI 96 may serve as the input device configured to receive the indication. In other examples, the switches 140 may serve as the input device and may be configured to receive the indication from the occupant 26. In still other examples, the cover detector 126 may serve as the input device. In general, the particular input device utilized by the occupant 26 may cause the processing circuitry 40 to select the operational modes based on manual inputs rather than automatic detection.

Referring now to FIG. 7, a method 700 for monitoring events in the vehicle 12 includes generating, via the time-of-flight sensor 16, the point cloud 24 of the interior 18 of the vehicle 12 at step 702. The point cloud 24 includes three-dimensional positional information of the interior 18. The method 700 further includes capturing, via the camera 120, the image data 122 representing the interior 18 of the vehicle 12 at step 704. The method 700 further includes processing, via the processing circuitry 40 in communication with the time-of-flight sensor 16 and the camera 120, the image data 122 from the camera 120 in a first operational mode at step 706. The method 700 further includes processing, via the processing circuitry 40, the point cloud 24 from the time-of-flight sensor 16 in the second operational mode at step 708. The method 700 further includes detecting, based on either of the image data 122, or the point cloud 24, the occupant 26 of the vehicle 12 at step 710. The method 700 further includes detecting an indication from the occupant 26 to disable the first operational mode at step 712. The method 700 further includes, at the processing circuitry 40, selectively operating between the first and second operational modes based on at least one of the image data 122 and the indication at step 714. For example, the indication may be communicated to the processing circuitry 40 via manual selection of the switches 140 and/or the first and second options 142, 144 presented at the HMI 96. The indication may alternatively originate from a signal from the lens cover sensor 126. In some examples, selective operation during the first and second operational mode is based on detecting a privacy condition based on the image data 122. As previously described, the privacy condition may be based on the identification of the occupants 26 in the interior 18. For example, determining that the occupant 26 is a child may result in selective operation from the first operational mode to the second operational mode.

It is contemplated that classification of the occupant 26 as a child may be based on a detected height of the occupant 26 according to processing pixel data of the images and/or analyzing the point cloud 24 from the time-of-flight sensors 16 to detect the three-dimensional position information. Thus, a pose or a stature may be determined based on the three-dimensional information and/or the pixel data to classify the occupant 26 as a child. In other examples, detection of the location of the eyes 130, nose 136, mouth 138, or other facial features relative to one another based on either of the point cloud 24 or the image data 122 may be employed to classify the occupant 26 as a child. For example, relatively short distances between the eyes 130 and the nose 136 as well as between one eye 130 to another eye 130, and between the eyes 130 to the mouth 138, may result in the processing circuitry 40 determining that the occupant 26 is likely a child. Upon determination of such a privacy condition, the processing circuitry 40 may deactivate the first operational mode and activate the second operational mode.

Figure 8:
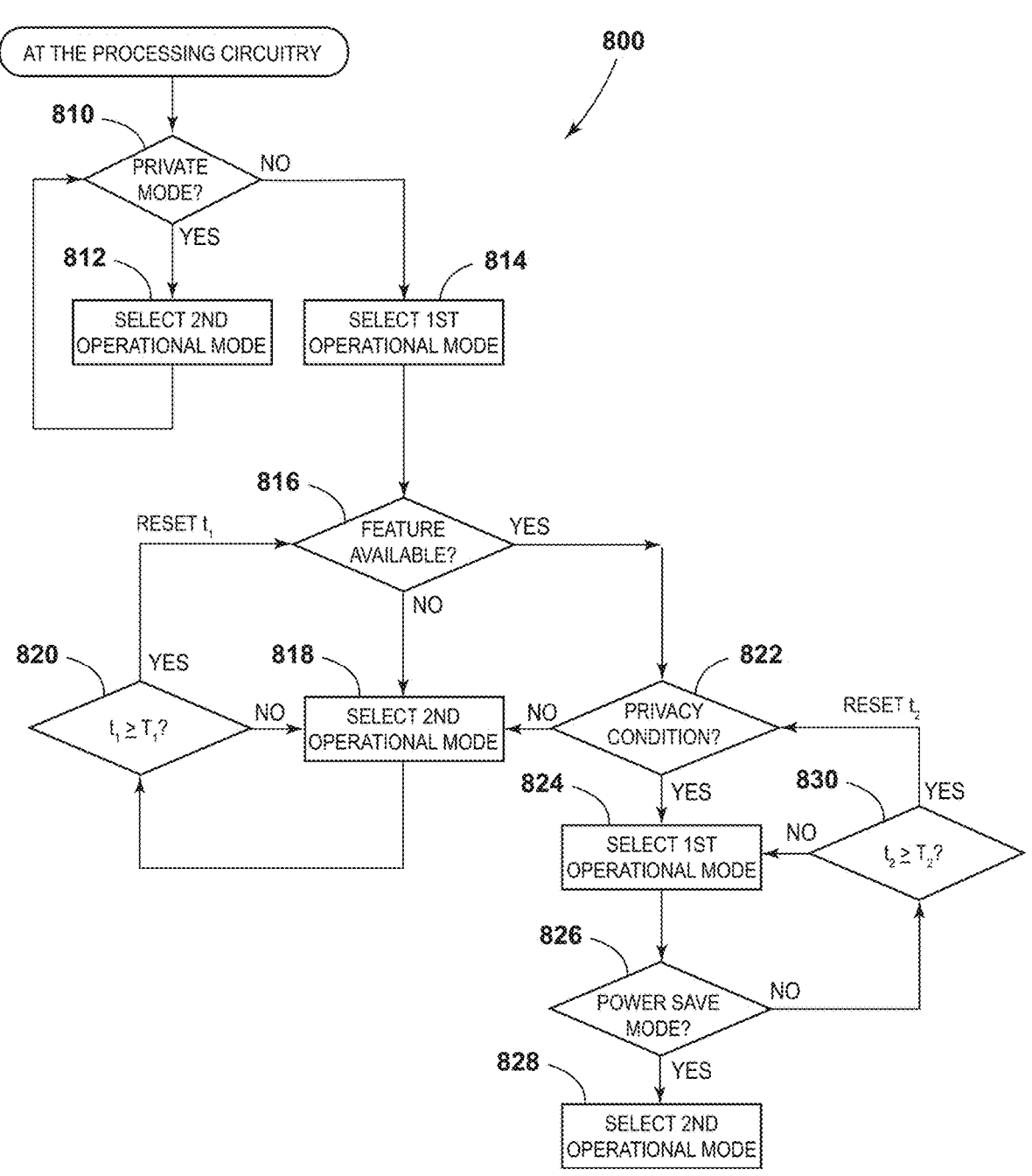
FIG. 8 is an exemplary flowchart of a process implemented by a detection system for a vehicle according to one aspect of the present disclosure.

Referring now to FIG. 8, a process 800 for the processing circuitry 40 includes detecting the privacy mode at 810. For example, the privacy mode may be detected based on the indication from the occupant 26. If the privacy mode is activated, the processing circuitry 40 may select the second operational mode at 812. For example, the processing circuitry 40 may enable operation of the time-of-flight sensors 16 (e.g., the LiDAR modules 22) and maintain or cause the second operational mode to be deactivated.

If the privacy mode is not activated, the processing circuitry 40 may nonetheless monitor for the privacy condition. For example, the processing circuitry 40 may select the first operational mode if the privacy mode is not on at 814. For example, the processing circuitry 40 may activate the camera 120 of the imaging system to capture image data 122 of the interior 18 and detect whether identification features are available based on the image data 122 at 816. For example, the processing circuitry 40 may process the image data 122 in one or more neural networks to determine an identity of the occupant 26. If the identification features are not available, the processing circuitry 40 may deactivate the first operational mode and select the second operational mode at 818. In this way, the processing circuitry 40 may be configured to save power even when a power save mode is not activated by the user. Upon selection of the second operational mode, the processing circuitry 40 may further be configured to periodically monitor the image data 122 at the first intervals $T_1$ at 820, such as after a first time $t_1$ determined by the processing circuitry 40. For example, the first interval $T_1$ may be in the range of seconds to minutes, and after an amount of time $t_1$ operating in the second operational mode exceeding the first interval $T_1$, the processing circuitry 40 may activate, temporarily, the imaging system 68 to determine whether identification features are available. If identification features are continuously unavailable, the processing circuitry 40 may continue to operate in the second operational mode and $t_1$ is reset. The images captured by the system 10 during the temporary operation may be emitted from storage in memory by the processing circuitry 40.

If and when identification features are available based on the image data 122, the processing circuitry 40 may process the identification features in a privacy condition detection algorithm, which may compare the identification features to pre-stored proportional data (e.g., smaller face, smaller stature, etc.) to determine the privacy condition at 822. If the privacy condition is detected, the processing circuitry 40 may select the second operational mode at 818. In this example, the processing circuitry 40 may deactivate the camera 120 and activate time-of-flight sensors 16 in response to detection of the privacy condition. If the privacy condition is not detected, the processing circuitry 40 may select the first operational mode (e.g., activate the camera 120) at 824 and continue to operate in the first operational mode unless and until the privacy condition is detected (then to 818) or the power save mode is activated (826) leading to 828.

If the power save mode is off, a second time $t_2$ of running in the first operational mode is compared to the second interval $T_2$ at 830. When the second time $t_2$ meets or exceeds the second interval $T_2$ the privacy condition is checked again at 822 and the second time $t_2$ is reset. In this way, the privacy condition may be recursively checked. The processing circuitry 40 may be configured to not store images captured during the recursive checking in some examples.

In general, the present detection system 10 may provide for limiting privacy concerns of passengers and/or a driver of the vehicle 12 by allowing for dynamic selection between imaging operation and LiDAR operation. The detection system 10, in either operation, may be configured to alert users to abnormal or substandard conditions in the interior 18, such as an occupant-left-behind condition, a pet-left-behind condition, suboptimal seating arrangements, insecurity of cargo 37, suboptimal comfort settings based on user profiles, or any other substandard condition detected in the vehicle 12. Further, the present detection system 10 may provide for active responses to detection of the various substandard conditions, such as adjustment to the seat control system 71, the lighting system 78, control of the vehicle 12 (via, e.g., the powertrain 82), or any other vehicle system previously described. Thus, the present detection system 10 and corresponding methods may allow for enhanced privacy protection to achieve at least similar responses as would be achieved using image analysis.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A system for monitoring one or more events in a vehicle, the system comprising:
   a time-of-flight sensor configured to generate a point cloud representing an interior of the vehicle, the point cloud including three-dimensional positional information of the interior;
   a camera configured to capture image data representing the interior of the vehicle; and
   processing circuitry in communication with the time-of-flight sensor and the camera configured to:
      process the image data from the camera in a corresponding first operational mode of the processing circuitry;
      process the point cloud from the time-of-flight sensor in a corresponding second operational mode of the processing circuitry;
      detect, based on either of the image data or the point cloud, an occupant of the vehicle;
      detect an indication from the occupant to disable the first operational mode;
      determine a privacy condition for the interior by processing identification features in the image data with a privacy detection algorithm, wherein the privacy detection algorithm compares the identification features to pre-stored proportional data;
      selectively operate between the first and second operational modes based on at least one of the image data and the indication;
      disable the first operational mode in response to detection of the privacy condition;
      enable the second operational mode in response to detection of the privacy condition;
      periodically enable the first operational mode temporarily and at intervals while in the second operational mode; and process the image data captured during the temporary enabling of the first operational mode to determine a change in the privacy condition.

2. The system of claim 1, wherein the processing circuitry is further configured to:
   determine an identity of the occupant based on the image data.

3. The system of claim 1, wherein the processing circuitry is further configured to:
   classify the occupant as a child based on at least one of the image data and the point cloud.

4. The system of claim 1, further comprising:
   a user interface in communication with the processing circuitry, wherein the processing circuitry is further configured to:
      communicate an instruction to present an option to enable the first operational mode at the user interface based on determining the change in the privacy condition;
      receive a selection by the occupant to select between the first and second operational modes; and
      update the second operational mode based on the selection.

5. The system of claim 1, wherein the processing circuitry is further configured to:
   determine a lighting condition of the interior based on the image data; and
   operate in the second operational mode based on the lighting condition.

6. The system of claim 5, further comprising:
   a light sensor in communication with the processing circuitry and configured to detect the lighting condition.

7. The system of claim 1, wherein the processing circuitry is further configured to:
   determine an ineffective condition of a monitoring algorithm for the interior based on the image data; and
   enable the second operational mode based on the ineffective condition.

8. The system of claim 1, further comprising:
   an input device in communication with the processing circuitry, wherein the input device is configured to receive the indication.

9. The system of claim 8, further comprising:
   a cover detector in communication with the processing circuitry and configured to detect an obstruction for the camera, wherein the input device is the cover detector.

10. The system of claim 1, wherein the processing circuitry is further configured to:
   compare a first power consumption level of the first operational mode to a second power consumption level of the second operational mode, wherein selective operation between the first and second operational modes is based further on the comparison of the power consumption levels.

11. The system of claim 10, further comprising:
   a user interface in communication with the processing circuitry, wherein the processing circuitry is further configured to:
      communicate an instruction to present an option to enable the first operational mode at the user interface based on the comparison of the power consumption levels;
      receive a selection by the occupant to select between the first and second operational modes; and
      update the second operational mode based on the selection.

12. A method for monitoring one or more events in a vehicle, the method comprising:

generating, via a time-of-flight sensor, a point cloud representing an interior of the vehicle, the point cloud including three-dimensional positional information of the interior;

capturing, via a camera, image data representing the interior of the vehicle;

processing, via processing circuitry in communication with the time-of-flight sensor and the camera, the image data from the camera in a corresponding first operational mode of the processing circuitry;

processing, via the processing circuitry, the point cloud from the time-of-flight sensor in a corresponding second operational mode of the processing circuitry;

detecting, based on either of the image data or the point cloud, an occupant of the vehicle;

detecting an indication from the occupant to disable the first operational mode;

determining, via the processing circuitry, a privacy condition for the interior by processing identification features in the image data with a privacy detection algorithm, wherein the privacy detection algorithm compares the identification features to pre-stored proportional data;

at the processing circuitry, selectively operating between the first and second operational modes based on at least one of the image data and the indication;

disabling the first operational mode in response to detection of the privacy condition;

enabling the second operational mode in response to detection of the privacy condition;

periodically enabling the first operational mode temporarily and at intervals while in the second operational mode; and processing the image data captured during the temporary enabling of the first operational mode to determine a change in the privacy condition.

13. The method of claim 12, further comprising:

determining an identity of the occupant based on the image data.

14. The method of claim 12, further comprising:

classifying the occupant as a child based on at least one of the image data and the point cloud.

15. A system for monitoring one or more events in a vehicle, the system comprising:

a time-of-flight sensor configured to capture a point cloud representing an interior of the vehicle;

a camera configured to capture image data representing the interior of the vehicle;

processing circuitry in communication with the time-of-flight sensor, the camera, and the input device, the processing circuitry configured to:

process the image data from the camera in a corresponding first operational mode of the processing circuitry;

process the point cloud from the time-of-flight sensor in a corresponding second operational mode of the processing circuitry;

detect, based on either of the image data or the point cloud, an occupant of the vehicle;

classify the occupant as a child based on at least one of the image data and the point cloud;

determine a privacy condition for the interior by processing identification features in the image data with a privacy detection algorithm, wherein the privacy detection algorithm compares the identification features to pre-stored proportional data;

disable the first operational mode in response to detection of the privacy condition;

enable the second operational mode in response to detection of the privacy condition;

periodically enable the first operational mode temporarily and at intervals while in the second operational mode; and process the image data captured during the temporary enabling of the first operational mode to determine a change in the privacy condition.

16. The system of claim 1, wherein periodically enabling the first operational mode temporarily and at intervals while in the second operational mode includes enabling the first operational mode at a first interval that is in the range of seconds to minutes.

17. The system of claim 16, wherein the processing circuitry is further configured to determine a change in the privacy condition by processing image data captured during a second interval when a time of running in the first operational mode meets or exceeds the second interval.

* * * * *